United States Patent
Foran et al.

(10) Patent No.: US 10,041,020 B2
(45) Date of Patent: Aug. 7, 2018

(54) PROCESS FOR RECOVERING CRUDE TALL OIL

(71) Applicant: Arizona Chemical Company, LLC, Jacksonville, FL (US)

(72) Inventors: Charles Douglas Foran, Savannah, GA (US); Francis Edwin Swann, Savannah, GA (US); Robert Earl Bowles, Panama City, FL (US)

(73) Assignee: Kraton Chemical, LLC, Jacksonville, FL (US)

( * ) Notice: Subject to any disclaimer, the term of this patent is extended or adjusted under 35 U.S.C. 154(b) by 0 days.

(21) Appl. No.: 15/510,884

(22) PCT Filed: Sep. 12, 2015

(86) PCT No.: PCT/US2015/049860
§ 371 (c)(1),
(2) Date: Mar. 13, 2017

(87) PCT Pub. No.: WO2016/040915
PCT Pub. Date: Mar. 17, 2016

(65) Prior Publication Data
US 2017/0283738 A1    Oct. 5, 2017

Related U.S. Application Data

(60) Provisional application No. 62/049,535, filed on Sep. 12, 2014.

(51) Int. Cl.
*C11B 13/00* (2006.01)
*C11B 3/00* (2006.01)
(Continued)

(52) U.S. Cl.
CPC .......... *C11B 13/005* (2013.01); *B03D 1/1431* (2013.01); *C11B 3/001* (2013.01);
(Continued)

(58) Field of Classification Search
CPC ..................................................... C11B 13/005
See application file for complete search history.

(56) References Cited

U.S. PATENT DOCUMENTS 2,240,365 A * 4/1941 Dreger ...................... C09F 1/00
530/205
2,296,952 A * 9/1942 Ross .......................... C09F 1/00
530/205
(Continued)

FOREIGN PATENT DOCUMENTS

GB          478275          1/1938
GB          518852          3/1940
(Continued)

*Primary Examiner* — Liam J Heincer
(74) *Attorney, Agent, or Firm* — Samantha Page; Cantor Colburn LLP (57) ABSTRACT

A process and apparatus for recovering crude tall oil are disclosed. Acidulation of a crude tall oil soap stream generates a spent acid stream that comprises lignin and entrained crude tall oil. By subjecting the spent acid stream to dissolved gas flotation, a lignin phase comprising entrained crude tall oil can be recovered and causticized, resulting in recovery of most of the crude tall oil that was present in the spent acid stream. A clarified spent acid stream is also generated, which can be treated with caustic and utilized for a soap washing process that integrates easily into the overall CTO recovery process. The apparatus comprises a crude tall oil acidulation unit, a dissolved gas flotation unit, a causticizing unit, and a soap separation unit. The inventive process marries dissolved gas flotation, a well-known water treatment process, with causticization of a recovered lignin phase, a step known from batch acidulation, to improve overall tall oil recovery from a continuous process.

16 Claims, 2 Drawing Sheets

(51) Int. Cl.
*C11B 3/04* (2006.01)
*C11B 3/06* (2006.01)
*C11B 3/16* (2006.01)
*B03D 1/14* (2006.01)

(52) U.S. Cl.
CPC ............... *C11B 3/04* (2013.01); *C11B 3/06* (2013.01); *C11B 3/16* (2013.01)

(56) References Cited

U.S. PATENT DOCUMENTS

| | | | | |
|---|---|---|---|---|
| 2,430,029 A | * | 11/1947 | Pollak | C09F 1/00 530/209 |
| 2,838,481 A | * | 6/1958 | Sullivan | C11D 15/00 530/208 |
| 3,575,952 A | * | 4/1971 | Morris | C09F 1/02 530/208 |
| 3,901,869 A | * | 8/1975 | Bills | C07C 51/02 530/209 |
| 4,001,114 A | | 1/1977 | Joseph et al. | |
| 4,154,725 A | * | 5/1979 | Otrhalek | C11B 13/005 162/16 |
| 4,238,304 A | | 12/1980 | Zucker | |
| 4,248,769 A | * | 2/1981 | Johansson | C11D 15/00 162/16 |
| 4,253,944 A | | 3/1981 | Hefner, Jr. | |
| 4,278,533 A | | 7/1981 | Hefner, Jr. | |
| 4,305,815 A | | 12/1981 | Hefner, Jr. | |
| 4,474,619 A | | 10/1984 | Meyer et al. | |
| 4,483,791 A | * | 11/1984 | Phillips, Jr. | C07C 51/42 530/208 |
| 4,495,095 A | * | 1/1985 | Lawson | C11B 13/02 530/209 |
| 4,514,292 A | | 4/1985 | Burdick | |
| 4,879,369 A | * | 11/1989 | Force | C09F 1/02 159/16.3 |
| 5,022,893 A | | 6/1991 | Myers et al. | |
| 6,172,183 B1 | * | 1/2001 | Leino | C11B 13/005 526/62 |
| 8,403,146 B2 | | 3/2013 | Hurd et al. | |
| 8,419,897 B2 | | 4/2013 | Bowles et al. | |
| 2009/0062516 A1 | * | 3/2009 | Belanger | C13K 13/00 530/502 |
| 2012/0123087 A1 | * | 5/2012 | Bowles | C11B 13/005 530/208 |
| 2015/0166931 A1 | * | 6/2015 | Bowles | C11B 13/005 530/208 |

FOREIGN PATENT DOCUMENTS

| | | |
|---|---|---|
| GB | 530798 | 12/1940 |
| GB | 531483 | 1/1941 |
| GB | 2110958 A | 6/1983 |
| GB | 2163975 A | 3/1986 |
| GB | 2251248 A | 7/1992 |
| WO | 01/60494 A1 | 8/2001 |
| WO | 2013/173077 A2 | 11/2013 |

\* cited by examiner

PROCESS FOR RECOVERING CRUDE TALL OIL

CROSS-REFERENCE TO RELATED APPLICATIONS

This application is the National Stage of International Application No. PCT/US2015/049860 filed Sep. 12, 2015, which claims the benefit of U.S. Provisional Application No. 62/049,535 filed Sep. 12, 2014, both of which are incorporated herein by reference in entirety.

FIELD OF THE INVENTION

The invention relates to a process and apparatus for recovering crude tall oil, particularly crude tall oil contained in a spent acid stream generated during acidulation of crude tall oil soap, and the products obtained therefrom.

BACKGROUND OF THE INVENTION

Tall oil is an important co-product of the Kraft process for pulping wood, especially wood derived from pine trees. A resinous, oily liquid, tall oil comprises a mixture of rosin acids and fatty acids and may be used in soaps, emulsions, lubricants, fuels and other applications. Crude tall oil (CTO) usually contains rosins, unsaponifiable sterols, resin acids (such as abietic acid), fatty acids (such as palmitic, oleic and linoleic acids), fatty alcohols, other sterols, and other alkyl hydrocarbon derivatives. The fatty acid fraction of tall oil (TOFA or tall oil fatty acids) is used to produce soaps, lubricants, and other products. Other related products include TOFA esters and tall oil rosins.

Black liquor is the filtrate from a Kraft "pulp mill" that contains the chemicals washed from the pulp after the digester. The concentration of the black liquor varies according to the type of pulp produced and the efficiency of the washing step. It will typically be 12-20% dissolved solids as it enters the weak liquor system. The black liquor is concentrated as it is processed in the multi-effect evaporators to "strong" black liquor that will typically be 45-55% dissolved solids and then to 70-80% dissolved solids as it is processed through direct contact or indirect contact concentrator(s). The chemical composition of black liquor is quite variable and is mostly dependent on the type of wood pulped and the chemical composition of the liquor used to pulp the wood chips. The dissolved solids consist of both organic and inorganic fractions. The organic fraction varies according to wood and type of process but will typically be ~80% of the dissolved solids while the inorganic fraction will typically be ~20% of the dissolved solids. The organic fraction consists mostly of lignin and chemical compounds that form from the decomposition of cellulose such as hemicellulose, sugars, and organic acids. The organic fraction of the black liquor contains an extractives fraction which will contain 3-5% based on the total dissolved solids. It is in the fraction that the tall oil soap resides which will contain the fatty and resin acids that the tall oil fractionator is interested in.

Crude tall oil soap is normally separated from black liquor of the Kraft process and is sent to an "acidulation" unit in which the soap is acidified to convert the soap to crude tall oil. Acidulation generates a spent acid phase along with the crude tall oil. If that were the end of the story, phase separation might be academic. However, acidulation also generates precipitates, principally calcium sulfate, and a lignin phase or "rag layer" containing some crude tall oil, spent acid, and lignin. Clean separation of these four phases is essential for good economics, but it can be tricky to achieve. For another description of the four phases, see U.S. Pat. No. 4,238,304 (col. 2, ll. 14-23).

Acidulation can be accomplished either batch wise or continuously. In a typical batch process, water, tall oil soap, and an acid (preferably sulfuric acid) are pumped into a large reactor, and the mixture is heated with steam and agitated until the mixture reaches 90-100° C. Thereafter, mixing is discontinued and the mixture is allowed to settle. Crude tall oil (upper phase) is first removed using a winch-operated skimmer arm or similar device. Spent acid is then removed. The remaining lignin phase can then be pumped out or treated with caustic in the reactor. In a "stacked" approach, the lignin phase is left in the reactor for multiple tall oil cooks. When enough lignin accumulates, it can be reacted with aqueous caustic to convert the precipitated lignin solids to soluble lignate salts. An advantage of the batch process is that with due care, relatively "clean" spent acid (i.e., spent acid that is relatively free of lignin) can be isolated.

Continuous acidulation processes utilize either gravity (with decanters) or centrifugal force (with centrifuges) to separate crude tall oil from a spent acid phase. Most of the lignin remains in the spent acid phase as it enters the decanter or centrifuge. Compared with the spent acid isolated from batch acidulation, the spent acid from continuous acidulations is relatively "dirty" because it contains dispersed lignin and a small but significant amount of crude tall oil. Our work here confirms that once it is separated from spent acid, this dispersed lignin phase can contain 5 wt. % or more of crude tall oil. Consequently, recovery of a substantial proportion of this "lost" crude tall oil represents a laudable economic goal. Unfortunately, unless the spent acid is returned to the plant's weak liquor system, continuous CTO plants usually allow only one chance to recover soap. Once the spent acid is separated from the products of the acidulation reaction, it is usually sent to a point downstream of the pulp mill's last soap recovery opportunity.

Dissolved air flotation ("DAF"), or more generally, dissolved gas flotation, has been widely used to clarify wastewater by removal of suspended matter such as oil or solids. Water (or wastewater) is saturated with air under pressure, and the air-saturated mixture is fed to a flotation tank or basin. As the pressure is released, tiny air bubbles float to the surface along with suspended matter that clings to the bubbles. A skimming device is used to remove the suspended matter from the liquid surface. Although dissolved air flotation has been utilized in the chemical industry, it apparently has not been used to treat spent acid from a crude tall oil soap acidulation process. DAF units are designed to operate at wastewater treatment temperatures below 40° C., while spent acid streams in a CTO plant are normally processed at more than 60° C.

In some cases, it would be desirable to combine a process for lignin removal with a crude tall oil soap washing process. Recently, we described a method for producing crude tall oil that utilizes an alkaline wash medium containing reduced amounts of lignates and inorganic solids to wash the crude tall oil soap (see U.S. Pat. No. 8,419,897). Part of the challenge in any soap washing scheme is to provide an aqueous wash stream that is reasonably free of lignin and other components that tend to emulsify or become entrained with the crude tall oil soap.

The industry would benefit from an improved process for recovering crude tall oil, particularly the crude tall oil that becomes entrained with lignin and is largely sacrificed in a spent acid phase following acidulation, particularly continuous acidulation, of crude tall oil soap. An ideal process would recover that crude tall oil while also providing a clarified acid phase that could be used, following treatment with caustic, as clean alkaline brine for soap washing.

SUMMARY OF THE INVENTION

In one aspect, the invention relates to a process for recovering crude tall oil. The process comprises first acidulating a crude tall oil soap stream to produce crude tall oil and a spent acid stream that comprises spent acid, lignin, and entrained crude tall oil. The spent acid stream is then subjected to dissolved gas flotation to separate a lignin phase comprising lignin and entrained crude tall oil from a clarified spent acid stream. The lignin phase is treated with caustic to convert the entrained crude tall oil to a recovered crude tall oil soap while generating an aqueous phase comprising dissolved lignates. The recovered crude tall oil soap is then isolated and re-acidulated to produce crude tall oil. The invention includes a lignin phase and crude tall oil obtained by the inventive process.

Another inventive aspect relates to apparatus for recovering crude tall oil soap or crude tall oil. The apparatus comprises a crude tall oil acidulation unit, a dissolved gas flotation unit, a causticizing unit, and a soap separation unit. The dissolved gas flotation unit is configured to accept from the acidulation unit a spent acid stream comprising spent acid, lignin, and entrained crude tall oil. The dissolved gas flotation unit is also configured to discharge a clarified spent acid phase and a lignin phase comprising lignin and entrained crude tall oil. The causticizing unit is configured to accept a base stream and the lignin phase, and to discharge to the soap separation unit crude tall oil soap and an aqueous phase comprising dissolved lignates.

In another embodiment, the present invention, relates to a crude tall oil spent acid composition including spent acid, lignin, crude tall oil and dissolved gas.

In another embodiment, the present invention, relates to a crude tall oil spent acid composition including a lignin phase comprising lignin and entrained crude tall oil; and a clarified spent acid phase.

In another embodiment, the present invention, relates to a crude tall oil soap composition including crude tall oil soap obtained from paper mill black liquor; and crude tall oil soap recovered from a lignin phase of crude tall oil spent acid.

In another embodiment, the present invention relates to a crude tall oil composition crude tall oil obtained from acidulated paper mill black liquor soap; and crude tall oil recovered from a lignin phase of a crude tall oil spent acid.

We surprisingly found that by subjecting a spent acid stream to dissolved gas flotation, the lignin phase contained in the spent acid can be recovered efficiently, and the crude tall oil contained therein can be recovered by caustic treatment. Thus, the inventive process marries dissolved gas flotation, a well-known water treatment process, with causticization of a recovered lignin phase, a step known from batch acidulation, to improve overall tall oil recovery from a continuous process.

Further, the clarified spent acid phase isolated from the dissolved gas flotation unit is well suited, following treatment with caustic, for use in a soap washing process that easily integrates into the overall CTO recovery process.

DETAILED DESCRIPTION OF THE INVENTION

In one aspect, the invention relates to a tall oil recovery process. In a first process step, a crude tall oil soap stream is acidulated to produce crude tall oil and a spent acid stream that comprises spent acid, lignin, and entrained crude tall oil. The amount of crude tall oil in the in the spent acid stream depends upon the efficiency of the pulp mill, and typically is in the range of 1 wt. % to 5 wt. % based upon the weight of the spent acid stream.

Acidulation involves reacting crude tall oil soap with a mineral acid, commonly sulfuric acid, to convert the soap to crude tall oil. The inventive process can be practiced with any desired source of crude tall oil (CTO) or crude tall oil soap. The composition of crude tall oil will depend on the species of wood from which it derives. Tall oil soap can be collected from coniferous woods, such as pine, but also from hardwood species, including birch. The crude tall oil may comprise saturated and unsaturated fatty acids, e.g., oleic acid, linoleic acid, linolenic acid, palmitic acid, palmitoleic acid, stearic acid, and others. Additionally, crude tall oil usually contains abietic acid, dehydroabietic acid, and other resin acids, as well as non-saponifiable components such as sterols.

The spent acid stream treated in the inventive process can be obtained from either a batch or continuous acidulation process. Spent acid from a batch process will normally be relatively clean because it can usually be drained from the reactor while leaving behind a lignin phase, as is discussed in the background. However, depending upon how carefully the separations are performed, spent acid from a batch process may be contaminated with enough lignin (and crude tall oil) to make the inventive process worthwhile.

As suggested earlier, the inventive process brings greater value to processes that acidulate tall oil soap continuously. In such a process, a mixture of crude tall oil, lignin, and spent acid is separated either by gravity, typically by using a decanter, or by centrifugal force using high-speed centrifuges or similar equipment. With either separation technique, two phases are usually separated, i.e., a crude tall oil phase and an aqueous phase. The aqueous phase is essentially "dirty" spent acid that contains the spent acid, dispersed lignin, inorganic salts, and some crude tall oil. Generally, 1-5 wt. % or 1-3 wt. % of crude tall oil is found in the spent acid phase or stream, based upon the total weight of the stream. Solid separation units designed to remove fibers, particulates, and at least some of the lignin may be used to pre-treat the reaction mixture upstream from the decanters or centrifuges, but these units are usually ineffective in removing lignin.

In a second step of the inventive process, the spent acid stream is subjected to dissolved gas flotation to separate a lignin phase comprising lignin and entrained crude tall oil from a clarified spent acid stream. This step can be practiced continuously.

Suitable methods and equipment for dissolved gas flotation are well known in the wastewater treatment field. Usually, the gas will be air, although other gases such as nitrogen, carbon dioxide, argon, or the like could be used. Suitable units for dissolved gas flotation are commercially available. In some aspects, the dissolved gas flotation utilizes air (a "DAF" unit). In some aspects, compressed air and water or recycle spent acid are combined in a pressurized vessel to saturate the water or recycle spent acid with air. In other aspects, no compressed air is used. Instead, the required pressure is built by introducing water, spent acid, or both and air into a centrifugal or regenerative turbine pump. This resulting air-saturated mixture is then sparged into a flotation tank or similar apparatus where untreated spent acid containing lignin is exposed to tiny air bubbles. A lignin phase accumulates on the spent acid surface and can be removed by skimming or siphoning. The clean spent acid is drained for further processing. In some aspects, the clean spent acid is sent, with or without a pH adjustment, to the pulp mill's liquor system. Some or all of the clean spent acid may be made alkaline (pH 10 to 13) and used for soap washing as is discussed further below. Some or all of the clean spent acid can be neutralized and sent to the pulp mill's sewer system.

Usually, the spent acid to be treated will be combined in advance with a coagulant, flocculant, or both prior to introducing the spent acid stream into the DAF unit. Coagulants are additives normally used to destabilize colloidal or dispersed particles and to induce growth to larger particle sizes. Coagulants well known for water treatment and suitable for use herein include, for example, aluminum sulfate, aluminum chloride, sodium aluminate, ferric sulfate, ferric chloride, hydrated lime, magnesium carbonate, and the like, as well as organic coagulants, particularly polyamines such as ChemTreat® P829L, a polymer reaction product of dimethylamine, ethylene diamine, and epichlorohydrin (product of ChemTreat, Inc.), the Superfloc® C-500 series (products of Kemira), or similar products. Because inorganic coagulants can cause deposits or scaling in a plant, organic coagulants are more desirable and are particularly preferred.

A flocculant may be included as an additive to assist in agglomeration of coagulated and finely divided suspended matter into aggregates or complexes. Flocculants well known for water treatment and suitable for use herein include inorganic flocculants, such as iron or aluminum salts, and organic flocculants. For reasons already discussed related to the coagulant, natural or synthetic organic flocculants are preferred. Suitable natural flocculants include polysaccharides (e.g., starch), gums, alginic acid, cellulose and its derivatives. Suitable synthetic flocculants are anionic, cationic, or nonionic polymers and include, for example, polyacrylamides, polyethylene oxide, cationic polyelectrolytes that include quaternary ammonium groups such as poly(diallyl dimethyl ammonium chloride) (also called "polyDADMAC"), and anionic polymers that contain sulfonate or carboxylate groups, such as polyacrylic acids or sulfonated polystyrenes. Cationic polyacrylamides such as ChemTreat® PG 906 are particularly preferred.

In general, any kind of pump can be used to generate the mixture of compressed gas and water or spent acid that is introduced into the DAF unit. For instance, a centrifugal pump can be used. We found, however, that in some aspects, a regenerative turbine pump is particularly valuable. In a turbine pump, such as the T series of regenerative turbine pumps available from MTH Pumps, fluid takes many trips through the impeller vanes, generating ten or more times the pressure of a centrifugal pump for a given impeller diameter and speed. Similar pumps are available from Nikuni and Hellbender. An advantage of using a regenerative turbine pump is the production of very tiny bubbles, i.e., bubbles that are 10 to 100 times smaller than are commonly produced during water treatment. Consequently, the number of bubbles generated can also be 10 to 100 times greater than that generated with a centrifugal pump, which translates to slower-rising bubbles that disrupt the accumulating lignin phase less and improve separation efficiency. Preferred regenerative turbine pumps can produce gas bubbles having an average diameter 50 µm or less, or 1 µm or less, or even 0.1 to 10 µm, or 0.2 µm to 5 µm.

Surprisingly, spent acid can be successfully treated in the DAF unit at normal CTO plant process temperatures. While conventional water treatment is normally practiced at temperatures below 40° C., we found that dissolved gas flotation can be used to treat spent acid from acidulation at temperatures greater than or equal to 50° C., or 50° C. to 90° C., or even 60° C. to 80° C.

Spent acid is usually delivered to the dissolved gas flotation unit at a pH within the range of 3 to 6, preferably 4.0 to 5.0, more preferably 4.1 to 4.5.

In some aspects, the dissolved gas flotation unit may include a series of parallel plates, lamella, or other packing material to provide more surface area and improved separation efficiency. When these elements are included in the dissolved gas flotation unit, relatively high flow rates through the DAF unit can be achieved while maintaining good separation of the lignin phase from the clarified spent acid.

In some aspects, the specific gravity of the lignin phase differs only slightly compared with that of the clarified spent acid phase. This small difference helps to explain why it is so difficult to achieve a clean separation of the lignin phase from the spent acid. The difference may be as little as 0.0020 g/cm$^3$, 0.0015 g/cm$^3$, 0.0010 g/cm$^3$ or even less. By subjecting the spent acid to dissolved gas flotation, this relatively tiny difference in specific gravity can be overcome as an obstacle to achieving clean separation.

Exiting the DAF unit are a lignin phase and a clarified spent acid stream. The lignin phase may comprise 10 to 30 wt. %, more typically 15 to 25 wt. %, of the spent acid stream that enters the DAF unit, while the balance is recovered as clarified spent acid.

The clarified spent acid, which usually includes sodium sulfate and sulfuric acid, and usually has a pH within the range of 3 to 6, can be neutralized with caustic and sent to the pulp mill's liquor system, or it can be made alkaline (pH 10-13) and used for soap washing. The clarified spent acid could also be sent to the sewer because of its reduced BOD content.

In a third process step, the lignin phase is reacted with caustic to convert crude tall oil entrained in the lignin phase to recovered tall oil soap. "Caustic" refers to aqueous solutions of sodium hydroxide. As used herein, "causticization" means caustic treatment of a lignin phase resulting in conversion of the crude tall oil entrained in the lignin phase to crude tall oil soap (also known in the art as "saponification") accompanied by conversion of precipitated lignin to dissolved sodium lignates in the high-pH aqueous phase.

As we discussed in the background section, caustic treatment of a lignin phase is practiced today in batch acidulations but not continuous processes. In continuous processes, most of the lignin is dispersed in the spent acid and is present when the spent acid reaches the decanter or centrifuge. In the inventive process, caustic treatment can be practiced continuously, semi-continuously, or batch wise, but it is advantageously performed continuously.

Caustic treatment of the lignin phase according to the inventive process can be performed by combining the lignin phase with caustic soda (e.g., 50% aq. sodium hydroxide solution) and preferably water (to the desired concentration)

in an agitated reaction tank at temperatures in the range of 30° C. to 100° C., or 50° C. to 80° C. Steam can be used to adjust the reaction temperature to the desired range. The pH in this step will be within the range of 10 to 13, or 11.0 to 12.5 . Product from the causticizing tank can then be transferred to a soap tank, where the mixture settles. The soap tank is desirably the same one used to collect or store crude tall oil soap from other sources, including the pulp mill's liquor system. As an alternative, product from the causticizing tank is sent to the pulp mill's weak liquor system before soap recovery.

Crude tall oil soap recovered from the lignin phase is removed from the top phase of the soap tank, along with any other crude tall oil soap introduced into the soap tank. The crude tall oil soap is ultimately re-acidulated to produce crude tall oil. The bottom phase from the soap tank (sometimes called "black liquor") will usually contain sodium hydroxide, sodium sulfate, other inorganic salts, sodium lignates, and a minor amount of crude tall oil in the form of tall oil soap (less than 5, 4, or even 3 wt. % based upon the weight of the bottom phase or black liquor phase). This phase is drained and sent to the pulp mill's weak liquor system (see, e.g., FIG. 1).

We found that the lignin phase isolated from the DAF unit can contain 5, 6, 7, 8, 9 or 10 wt. % or more of crude tall oil based upon the weight of the lignin phase. At least about 10%, 20%, 30%, 40%, 50%, 60%, 70% or 80%, 90%, or even from about 10% or more up to about 99%, of that 10 wt. % may be recovered as crude tall oil soap following the causticization step. While this amount may sound small, over the course of a year, it can amount to hundreds or even thousands of tons of additional recovered crude tall oil, i.e., a considerable cost savings. Moreover, the capital cost to incorporate the additional apparatus needed to implement the inventive process in an existing continuous CTO plant is modest and can pay for itself in short order. For instance, the added "skid" could simply include mix tanks for combining spent acid with coagulant and/or flocculant, the DAF unit, a causticizing tank, some pumps, and the usual valves and piping.

In sum, the inventive process marries dissolved gas flotation, with causticization of a recovered lignin phase, a step known from batch acidulation, to improve overall tall oil recovery from a continuous process.

Figure 2:
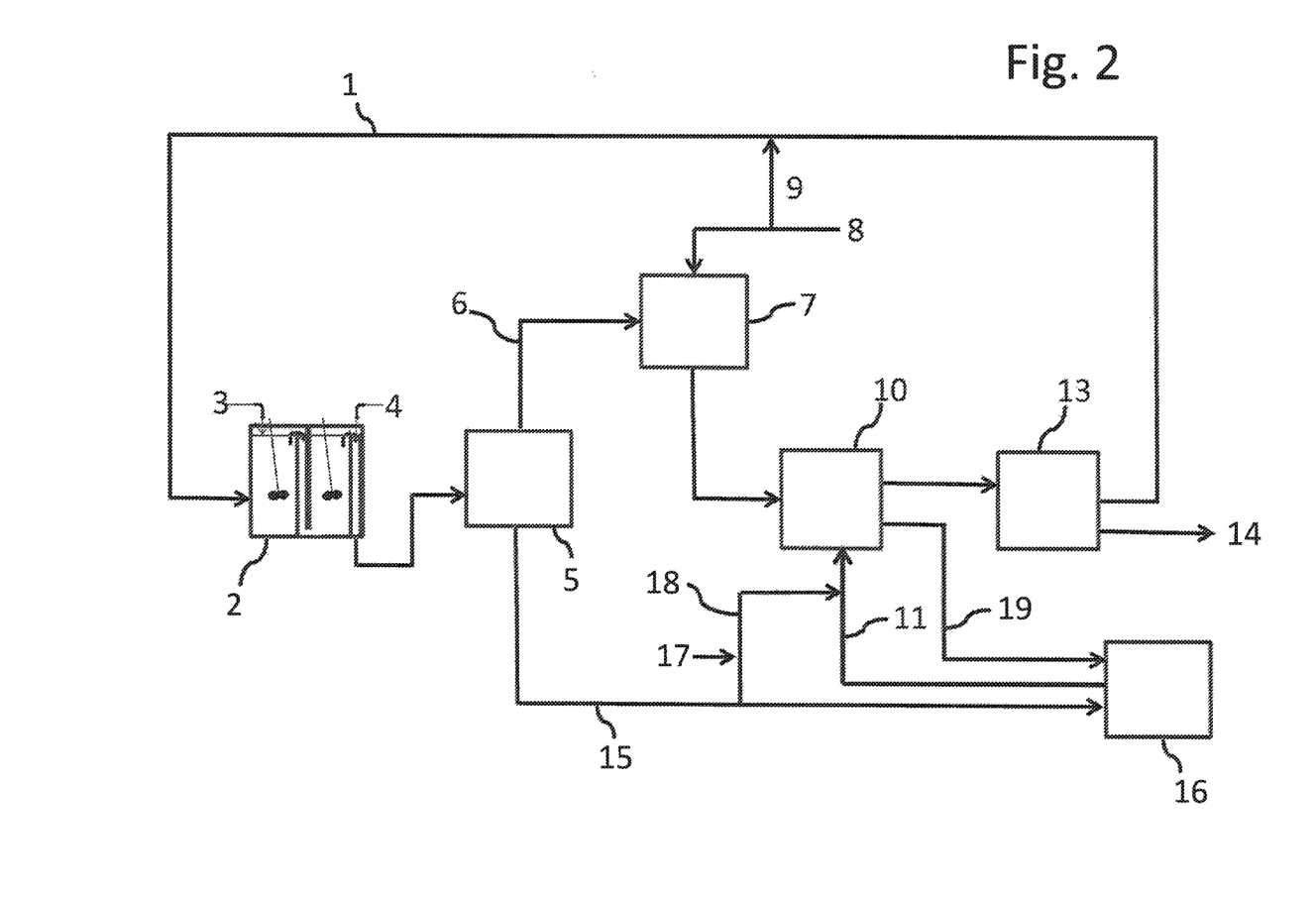
FIG. 2 shows a way to integrate soap washing into the dissolved gas flotation/causticization process outlined in FIG. 1 in accord with another aspect of the invention.

The inventive process advantageously generates a stream of clarified spent acid. The clarified spent acid can be made alkaline (pH 10 to 13) and used for washing black liquor soap (also called "soap pre-treatment"). Unless the spent acid stream is sufficiently "clean," it is not desirable for soap washing. However, because dissolved gas flotation generates a clean spent acid stream, the stream is available (after treatment with caustic) for use as clean "alkaline brine." Soap washing easily integrates into an existing continuous CTO plant at minimal capital expense. Spent acid is made alkaline, then combined with soap from the pulp mill's liquor system and pumped into the soap tank where the soap can be washed. Usually, the soap is diluted with 5 to 50 vol. %, or 10 to 40 vol. %, of the alkaline brine. Treatment times for soap washing can vary but typically range from an hour or so to a few days, preferably 4 to 48 hours, or 8 to 24 hours. After the layers settle, the washed soap is forwarded to the CTO plant's acidulation unit, while the lower aqueous phase, also known as "fortified brine," is drained from the soap tank and sent to the pulp mill's liquor system. The fortified brine may have commercial value as fuel, more specifically "higher heating value," because of its dissolved lignates content. FIG. 2 illustrates one way to integrate soap washing into a process according to the invention.

In general, the conditions selected for soap washing will depend on the source and nature of the soap to be washed, the relative difficulty of acidulating the particular soap, the desired degree of calcium removal, the desired higher heating value of the fortified brine leaving the soap tank, the maximum desired amount of sulfuric acid to be used for acidulation, and other factors that are within the skilled person's discretion. Generally, conditions are selected that will maximize crude tall oil yield. When maximum calcium removal from the soap is desired, a relatively high pH and a relatively high brine dilution rate will be used. When it is more desirable to minimize the amount of sulfuric acid needed for acidulation or to maximize the higher heating value of the fortified brine, a relatively low pH and a relatively low brine dilution rate will be used. Soap washing has been described in more detail elsewhere (see, e.g., U.S. Pat. No. 8,419,897, the teachings of which are incorporated herein by reference, and references cited therein).

In another aspect, the invention relates to a lignin phase isolated from the inventive process. As noted earlier, this lignin phase is relatively rich in entrained crude tall oil that can be recovered by causticizing the lignin phase and converting the resulting crude tall oil soap to crude tall oil.

In another aspect, the invention relates to crude tall oil recovered from the inventive process.

In another embodiment, the present invention, relates to a crude tall oil spent acid composition including spent acid, lignin, crude tall oil and dissolved gas. The dissolved gas may be in the form of bubbles having an average diameter less than 1 μm, less than 0.8 μm, less than 0.5 μm, or even from about 0.1 μm to about 1.0 μm. The gas may be composed of a pure gas (e.g., an atomic gas, such as a noble gas, an elemental gas, such as oxygen or nitrogen, or a gas from compound molecules, such as carbon dioxide), or it may be a mixture of gases, such as air.

In another embodiment, the present invention, relates to a crude tall oil spent acid composition including a lignin phase comprising lignin and entrained crude tall oil; and a clarified spent acid phase. In an embodiment, the lignin phase includes at least 5 wt. %, 6 wt. %, 7 wt. %, 8 wt. %, 9 wt. %, or 10 wt. % or more of the entrained crude tall oil based upon the total weight of the lignin phase. In a further embodiment, the lignin phase includes at least 10 wt. %, 11 wt. %, 12 wt. %, 13 wt. %, 14 wt. %, 15 wt. %, 16 wt. %, 17 wt. %, 18 wt. %, 19 wt. %, 20 wt. % or more of the spent acid composition. In an even further embodiment, the clarified spent acid phase comprises 0.5 wt. %, 0.4 wt. %, 0.3 wt. %, 0.2 wt. %, or even 0.1 wt. % or less of crude tall oil, based upon the total weight of the clarified spent acid phase.

In another embodiment, the present invention, relates to a crude tall oil soap composition including crude tall oil soap obtained from paper mill black liquor; and crude tall oil soap recovered from a lignin phase of crude tall oil spent acid. In an embodiment, the lignin phase includes at least 5 wt. %, 6 wt. %, 7 wt. %, 8 wt. %, 9 wt. %, or 10 wt. % or more of the crude tall oil based upon the total weight of the lignin phase. In a further embodiment, the lignin phase includes at least 10 wt. %, 11 wt. %, 12 wt. %, 13 wt. %, 14 wt. %, 15 wt. %, 16 wt. %, 17 wt. %, 18 wt. %, 19 wt. %, 20 wt. % or more of the spent acid. In an even further embodiment, the spent acid comprises 0.5 wt. %, 0.4 wt. %, 0.3 wt. %, 0.2 wt. %, or even 0.1 wt. % or less of crude tall oil, based upon the total weight of the spent acid.

In another embodiment, the present invention relates to a crude tall oil composition crude tall oil obtained from acidulated paper mill black liquor soap; and crude tall oil recovered from a lignin phase of a crude tall oil spent acid. In an embodiment, the lignin phase includes at least 5 wt. %, 6 wt. %, 7 wt. %, 8 wt. %, 9 wt. %, or 10 wt. % or more of the crude tall oil based upon the total weight of the lignin phase. In a further embodiment, the lignin phase includes at least 10 wt. %, 11 wt. %, 12 wt. %, 13 wt. %, 14 wt. %, 15 wt. %, 16 wt. %, 17 wt. %, 18 wt. %, 19 wt. %, 20 wt. % or more of the spent acid composition. In an even further embodiment, the spent acid phase comprises 0.5 wt. %, 0.4 wt. %, 0.3 wt. %, 0.2 wt. %, or even 0.1 wt. % or less of crude tall oil, based upon the total weight of the spent acid.

In one embodiment, the invention includes apparatus for recovering crude tall oil soap or crude tall oil. The apparatus comprises a crude tall oil acidulation unit, a dissolved gas flotation unit, a causticizing unit, and a soap separation unit. The dissolved gas flotation unit, preferably a DAF, is configured to accept from the acidulation unit a spent acid stream comprising spent acid, lignin, and entrained crude tall oil. The dissolved gas flotation unit, and is configured to discharge a clarified spent acid phase and a lignin phase comprising lignin and entrained crude tall oil. The causticizing unit is configured to accept a base stream and the lignin phase. The causticizing unit is also configured to discharge to the soap separation unit a recovered crude tall oil soap and an aqueous phase comprising dissolved lignates.

In a further aspect, the dissolved gas flotation unit comprises a regenerative turbine pump, preferably one capable of producing gas bubbles having an average diameter less than 1 μm.

In another aspect, the dissolved gas flotation unit comprises a series of parallel plates, lamella, or other packing material.

In an even further aspect, the dissolved gas flotation unit further comprises one or more mix tanks for combining the spent acid stream with a coagulant, a flocculant, or both prior to subjecting the spent acid stream to dissolved gas flotation.

DESCRIPTION OF THE DRAWINGS

Figure 1:
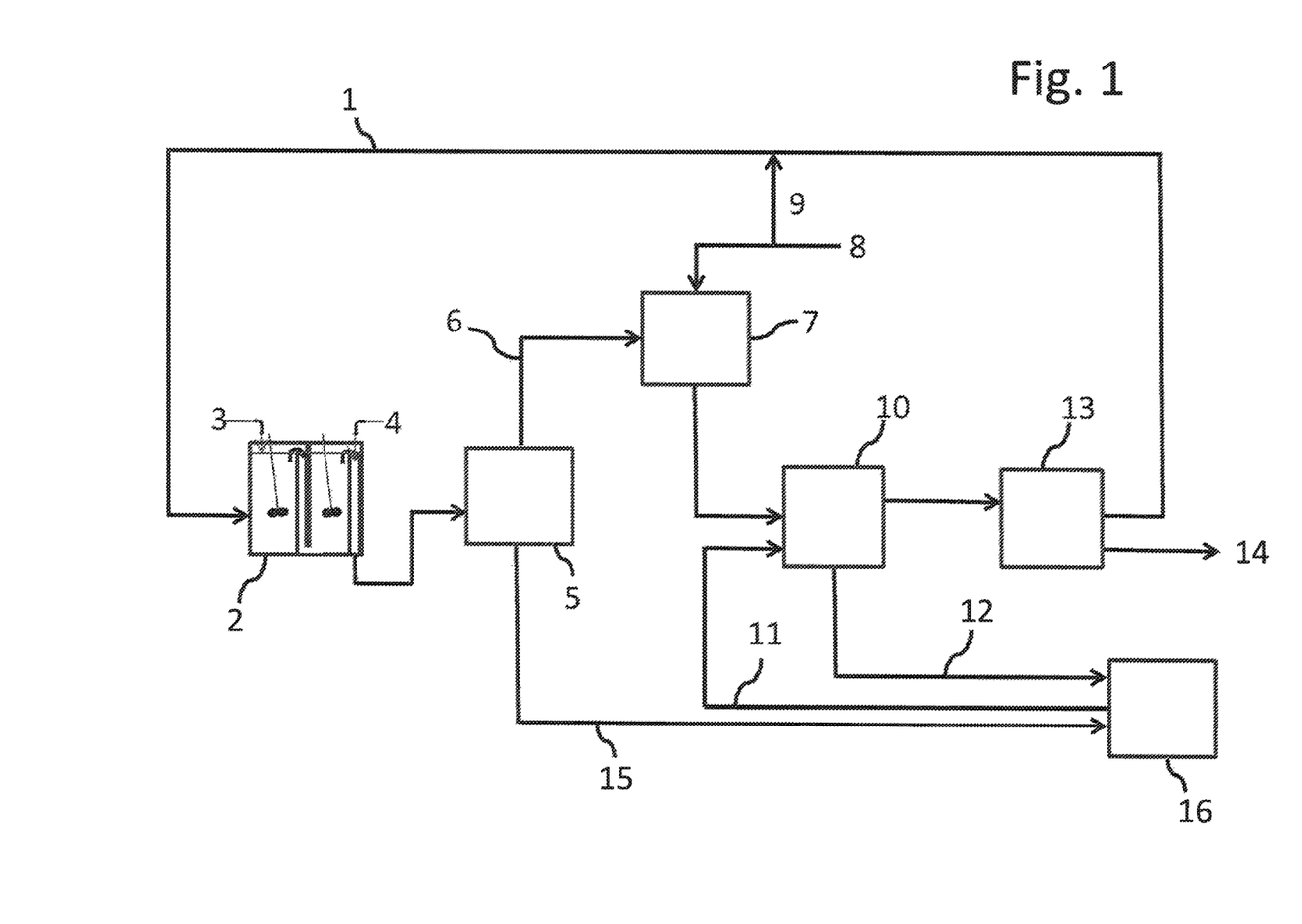
FIG. 1 illustrates a system for treating spent acid from an acidulation process using dissolved gas flotation, followed by separation of a lignin phase from a clarified aqueous phase, and causticization of the lignin phase to recover crude tall oil in accord with one aspect of the invention.

FIG. 1 illustrates a system for treating spent acid from a CTO plant's process using dissolved gas flotation, followed by separation of a lignin phase from a clarified aqueous phase, and causticization of the lignin phase to recover crude tall oil in accord with one aspect of the invention. Black liquor, which comprises crude tall oil soap, obtained from a pulp mill is fed into a CTO plant in order to recover crude tall oil. Following a pH adjustment with caustic soda (9), spent acid from the CTO plant's acidulation unit (13) flows through feed line (1) into a dual-chamber mix tank (2), where the spent acid is combined with a coagulant (3) in a first chamber of the mix tank. Overflow from the first chamber of the mix tank empties into the second chamber of the mix tank. Overflow from the second chamber of the mix tank is combined with pre-diluted flocculant (4) on its way to dissolved air flotation (DAF) unit (5). In the DAF unit, a lignin phase (6) comprising lignin and entrained crude tall oil is separated from a clarified spent acid stream (15), which is transferred to the pulp mill's liquor system (16). The lignin phase (6) is combined with caustic soda (8) in causticizing unit (7). The treated product from the causticizing unit (7), which contains crude tall oil soap and an aqueous phase comprising high-sulfate black liquor, is transferred along with tall oil soap from the pulp mill's liquor system (11) to soap tank (10), where an upper phase comprising recovered crude tall oil soap is isolated and sent to the CTO plant (13). Drained high-sulfate black liquor (12) from the soap tank is sent to the pulp mill's liquor system. In the CTO plant (13), the recovered soap is acidulated and converted to crude tall oil (14).

In one embodiment according to the present invention, the lignin phase (6) may be used as a dust suppressant in various applications, such as in road construction. In addition, the lignin phase may be compressed and dried for use as fuel pellets. In another embodiment according to the invention, the clarified spent acid (15) may be used as a feed to an electrolysis cell for the manufacture of weak sulfuric acid and membrane grade caustic, which may be used in the pulp mill Kraft process.

FIG. 2 shows a way to integrate soap washing into the dissolved gas flotation/causticization process outlined in FIG. 1 in accord with another aspect of the invention. At least a portion of the clarified spent acid stream (15) from DAF unit (5) is adjusted with caustic (17) to pH 10-13, and the resulting alkaline brine (18) is combined with tall oil soap from the pulp mill's liquor system (11). The treated product from causticizing unit (7) is transferred to soap tank (10), where an upper phase comprising crude tall oil soap is isolated and sent to the acidulation unit of CTO plant (13). The lower aqueous phase from the soap tank is fortified brine (19), which is drained from the soap tank and transferred to the pulp mill's liquor system (16). In the CTO plant, the recovered soap is acidulated and converted to crude tall oil (14).

The following example merely illustrates the invention; the skilled person will recognize many variations that are within the spirit of the invention and scope of the claims.

Recovery of Crude Tall Oil Soap using Dissolved Air Flotation

During a five-day trial, spent acid containing lignin from the acidulation unit of a crude tall oil plant is adjusted to pH 4.0 to 4.5 and is treated to recover crude tall oil that is entrained in the lignin phase. The spent acid is combined in a first agitated mix tank with an organic coagulant. The coagulant is introduced into the first mix tank using a positive displacement metering pump interfaced with a unit feed rate flow meter. Overflow from the first mix tank pours into a second mix tank where further mixing occurs. Overflow from the second mix tank is combined with a polyacrylamide flocculant stream, which has been pre-diluted to allow the flocculant to expand.

The overflow/flocculant mixture (at about 70° C.) is then fed using a regenerative turbine pump at about 80 gal/min to a dissolved air flotation (DAF) unit. The DAF unit is a standard unit used for wastewater treatment and includes a plurality of inclined plates to enhance separation. The bubble size of the dissolved air is exceptionally small (<1 μm), and the number of bubbles generated is 10-100× greater than is typical for water treatment.

About 21% of the treated mixture is separated as a lignin phase from the DAF unit, while the other 79% is recovered as clarified spent acid. The lignin phase is transferred to an agitated tank, where it is treated with 50% aqueous sodium hydroxide. The causticized product is transferred to a much larger vessel (the soap tank) in which the soap layer is allowed to float to the surface, while the aqueous phase (high-sulfate black liquor) settles to the bottom. Periodically, the high-sulfate black liquor is pumped from the bottom of the soap tank and transferred to the plant's weak liquor tank. Recovered soap is sent to the CTO plant for acidulation.

Analysis of the lignin phase prior to causticization reveals that it contains about 10.2 wt. % of crude tall oil. The high-sulfate black liquor phase contains about 2.9 wt. % of crude tall oil. Consequently, an overall 78% recovery of crude tall oil (as CTO soap) from the lignin phase is achieved.

The compositions and methods of the appended claims are not limited in scope by the specific compositions and methods described herein, which are intended as illustrations of a few aspects of the claims. Any compositions and methods that are functionally equivalent are intended to fall within the scope of the claims. Various modifications of the compositions and methods in addition to those shown and described herein are intended to fall within the scope of the appended claims. Further, while only certain representative compositions and method steps disclosed herein are specifically described, other combinations of the compositions and method steps also are intended to fall within the scope of the appended claims, even if not specifically recited. Thus, a combination of steps, elements, components, or constituents may be explicitly mentioned herein or less, however, other combinations of steps, elements, components, and constituents are included, even though not explicitly stated.

It may be evident to those of ordinary skill in the art upon review of the exemplary embodiments herein that further modifications, equivalents, and variations are possible. All parts and percentages in the examples, as well as in the remainder of the specification, are by weight unless otherwise specified. Further, any range of numbers recited in the specification or claims, such as that representing a particular set of properties, units of measure, conditions, physical states or percentages, is intended to literally incorporate expressly herein by reference or otherwise, any number falling within such range, including any subset of numbers within any range so recited. For example, whenever a numerical range with a lower limit, $R_L$, and an upper limit $R_U$, is disclosed, any number R falling within the range is specifically disclosed. In particular, the following numbers R within the range are specifically disclosed: $R=R_L+k(R_U-R_L)$, where k is a variable ranging from 1% to 100% with a 1% increment, e.g., k is 1%, 2%, 3%, 4%, 5%. . . . 50%, 51%, 52%. . . . 95%, 96%, 97%, 98%, 99%, or 100%. Moreover, any numerical range represented by any two values of R, as calculated above is also specifically disclosed. Any modifications of the invention, in addition to those shown and described herein, will become apparent to those skilled in the art from the foregoing description and accompanying drawings. Such modifications are intended to fall within the scope of the appended claims. All publications cited herein are incorporated by reference in their entirety.

The term "comprising" and variations thereof as used herein is used synonymously with the term "including" and variations thereof and are open, non-limiting terms. Although the terms "comprising" and "including" have been used herein to describe various embodiments, the terms "consisting essentially of" and "consisting of" can be used in place of "comprising" and "including" to provide for more specific embodiments of the invention and are also disclosed. Other than where noted, all numbers expressing geometries, dimensions, and so forth used in the specification and claims are to be understood at the very least, and not as an attempt to limit the application of the doctrine of equivalents to the scope of the claims, to be construed in light of the number of significant digits and ordinary rounding approaches.

Unless defined otherwise, all technical and scientific terms used herein have the same meanings as commonly understood by one of skill in the art to which the disclosed invention belongs. Publications cited herein and the materials for which they are cited are specifically incorporated by reference.

The preceding example and figures are meant only as illustrations; the following claims define the inventive subject matter.

We claim:
1. A process which comprises:
 (a) acidulating a crude tall oil soap stream to produce crude tall oil and a spent acid stream that comprises spent acid, lignin, and entrained crude tall oil;
 (b) subjecting the spent acid stream to dissolved gas flotation to separate a lignin phase comprising lignin and entrained crude tall oil from a clarified spent acid stream;
 (c) causticizing the lignin phase to convert the entrained crude tall oil to a recovered tall oil soap and generate an aqueous phase comprising dissolved lignates;
 (d) isolating the recovered crude tall oil soap; and
 (e) optionally reacidulating the recovered crude tall oil soap to produce crude tall oil;
 wherein step (b) is performed in the presence of dissolved gas bubbles having an average diameter less than 1 µm.

2. The process of claim 1 wherein dissolved air flotation is used in step (b).

3. The process of claim 1 wherein the pH of the clarified spent acid stream is adjusted to be within the range of 10-13, and the resulting alkaline brine is used to wash black liquor soap.

4. A continuous process of claim 1.

5. The process of claim 1 wherein step (b) is performed at a temperature greater than or equal to 50° C.

6. The process of claim 1 wherein step (b) is performed at a temperature within the range of 50° C. to 90° C.

7. The process of claim 1 wherein step (b) is performed at a temperature within the range of 60° C. to 80° C.

8. The process of claim 1 wherein step (b) is performed at a pH within the range of 4.0 to 5.0.

9. The process of claim 1 wherein step (b) is performed at a pH within the range of 4.1 to 4.5.

10. The process of claim 1 wherein the difference in specific gravities between the lignin phase and the clarified spent acid stream is less than or equal to 0.002 g/cm3.

11. The process of claim 1 wherein step (b) is performed in the presence of an organic coagulant.

12. The process of claim 1 wherein step (b) is performed in the presence of a polyacrylamide flocculant.

13. The process of claim 1, using apparatus for recovering crude tall oil soap or crude tall oil, comprising:
 (a) a crude tall oil acidulation unit;
 (b) a dissolved gas flotation unit;
 (c) a causticizing unit; and
 (d) a soap separation unit;
 wherein the dissolved gas flotation unit is configured to accept from the acidulation unit a spent acid stream comprising spent acid, lignin, and entrained crude tall oil, and is configured to discharge a clarified spent acid phase and a lignin phase comprising lignin and entrained crude tall oil; and
 wherein the causticizing unit is configured to accept a base stream and the lignin phase, and to discharge to the soap separation unit a recovered crude tall oil soap and an aqueous phase comprising dissolved lignates.

14. The process of claim 1, wherein the spent acid stream obtained by step (a) comprises:
 (a) a lignin phase comprising the lignin and the entrained crude tall oil; and (b) a clarified spent acid phase comprising the spent acid;

wherein the lignin phase comprises at least 5 wt. % or more of the entrained crude tall oil, and wherein the lignin phase further comprises at least 10 wt. % of the spent acid stream.

15. The process of claim 1, for preparing a crude tall oil soap composition comprising:
   (a) crude tall oil soap obtained from Kraft paper mill black liquor; and
   (b) crude tall oil soap recovered from a lignin phase of crude tall oil spent acid.

16. The process of claim 1, for preparing a crude tall oil composition comprising:
   (a) crude tall oil obtained from acidulated Kraft paper mill black liquor soap; and
   (b) crude tall oil recovered from a lignin phase of a crude tall oil spent acid.

* * * * *